(12) United States Patent
Mulvey

(10) Patent No.: US 7,217,363 B2
(45) Date of Patent: May 15, 2007

(54) FILTRATION SYSTEM

(76) Inventor: Kevin Mulvey, 4505 Prosperity Dr., Fort Pierce, FL (US) 34981

( * ) Notice: Subject to any disclaimer, the term of this patent is extended or adjusted under 35 U.S.C. 154(b) by 0 days.

(21) Appl. No.: 10/845,846

(22) Filed: May 14, 2004

(65) Prior Publication Data
US 2004/0238429 A1 Dec. 2, 2004

Related U.S. Application Data

(60) Provisional application No. 60/473,216, filed on May 27, 2003.

(51) Int. Cl.
B01D 24/46 (2006.01)
(52) U.S. Cl. ........ 210/279; 210/289
(58) Field of Classification Search ........ 210/279, 210/289, 291
See application file for complete search history.

(56) References Cited

U.S. PATENT DOCUMENTS

| | | | | |
|---|---|---|---|---|
| 1,794,765 A | * | 3/1931 | Green | 210/269 |
| 1,997,114 A | * | 4/1935 | Martin | 210/717 |
| 2,956,682 A | * | 10/1960 | Stephan | 210/291 |
| 3,189,181 A | * | 6/1965 | Couse | 210/291 |
| 3,747,768 A | * | 7/1973 | Barrera | 210/288 |
| 3,847,805 A | * | 11/1974 | Voedisch | 210/675 |
| 4,098,695 A | * | 7/1978 | Novotny | 210/85 |

* cited by examiner

Primary Examiner—Ivars C. Cintins
(74) Attorney, Agent, or Firm—Norman Friedland

(57) ABSTRACT

A filtration system for cleaning a fluid, typically water, that is contained in a tank having a rounded base and which cleans, during the backwash cycle, the filter media and, in particular, cleans the media in a usually stagnant area found in the rounded base of the tank. Most filtration system include a first pipe array located above the rounded base which provide for backwashing of the upper portion of the tank, but leaves the base area below the first pipe array stagnant and subject to the growth of harmful bacteria. The present invention adds a second array which is located in the base area and therefore is able to clean during the backwash cycle, an area that is left stagnant in most other systems. The second array is configured to follow the contours of the base of the tank to give it a greater cross sectional area than a flat array. This configuration results in greatly improved effectiveness over that provided by the conventional single flat array.

2 Claims, 3 Drawing Sheets

FILTRATION SYSTEM

This application claims the benefit of U.S. Provisional Application Ser. No. 60/473,216, filed on May 27, 2003.

BACKGROUND

1. Field

The present invention relates to liquid filtration systems and more particularly to such systems that are housed within tanks and are designed to eliminate stagnation that often occurs in the base of the tank.

2. Prior Art

Most prior art liquid filtration systems include a closed tank with an outer skin or shell that is used to house the filtrations system. Such filtration systems are often used to clean the water used in swimming pools. The tanks are typically cylindrical with rounded, rather than flat, ends. The rounded ends allow less material to be used in the tank wall to withstand the pressure in the tank. The tanks may be positioned vertically with a rounded end being located at the bottom of the tank or the tank may be positioned horizontally where it will still have a rounded bottom.

Within the tank, immediately above the round bottom, is a header which generally runs from the front towards the back of the tank. At the front of the tank is a flange that is connected to the tank to provide a through connection for the header to the outside of the tank. Fanning out from the side of the header within the tank are horizontally positioned lateral pipes (laterals) which have thin slots on their sides. These slots let water pass in and out of the laterals but will not let the tank's filtration media, such as sand, enter the pipes. The ends of the laterals away from the header are typically capped.

During a backwash cycle, used to clean the filtration media, water is pumped into the header under pressure, where it is distributed to the laterals, and forced out through the thin slots in the laterals into the media to dislodge and wash away the contamination contained in the media.

Unfortunately, the water used for back washing passes upward through the media from the laterals. The area below the laterals is left stagnant and can permit the growth of bacteria. Deaths have been reported due to bacterial infection which was found to be harbored in the stagnant area of a tank used in the filtration system of a swimming pool.

The importance of eliminating the stagnant areas in filters is illustrated by a news release presented by the British Gardian dated Jan. 05, 2004. Four men on a cruise ship to Bermuda all fell ill. When back on shore, all had a fever so fierce that one received brain damage and another died. The source of the fever was bacteria which grew in a hot tub filter. Punitive damages were seven million dollars. This problem exists in many currently used filters and is obviously an extremely important health matter.

The reason the laterals of the first array are generally not positioned lower in the tank in the rounded base of the tank is that laterals of a length that could be accommodated in an area above the tank base cannot be accommodated in the base tank because of interference with the rounded wall of the tank. Using shorter laterals is not a good option as it reduces the filtration area provided by the laterals and therefore reduced the performance rating of the filtration system.

Prior art attempts to solve this problem did included reducing the lengths of the laterals of the first array so that they could fit into the base of a tank. However, this had the obvious short coming of reducing the effective area of the laterals and thus reduces the filtration capability of the system.

Another prior art approach was to pour concrete into the rounded area to fill it. This technique was abandoned about 30 years ago and filter material such as sand was used to fill this area. Unfortunately, dangerous bacteria can and does grow in this area when filter material such as sand is used as fill.

Yet another prior art approach is to build a floor in the tank immediately below the lateral in the fist array. The floor covers the round stagnation area and thereby eliminates the area in which bacteria would normally grow. A major problem with this approach is the floor is flat and must withstand great pressure. It has to be much thicker than the rounded tank walls to withstand the pressure within the tank. Building this floor is a cumbersome and costly process.

The present invention provides a system which back-washes the stagnant area simply, completely and at low in cost, and at the same time increases the filtration capability of the system. It uses only standard plumbing parts and is easily fabricated at low cost.

SUMMARY

Figure 1:
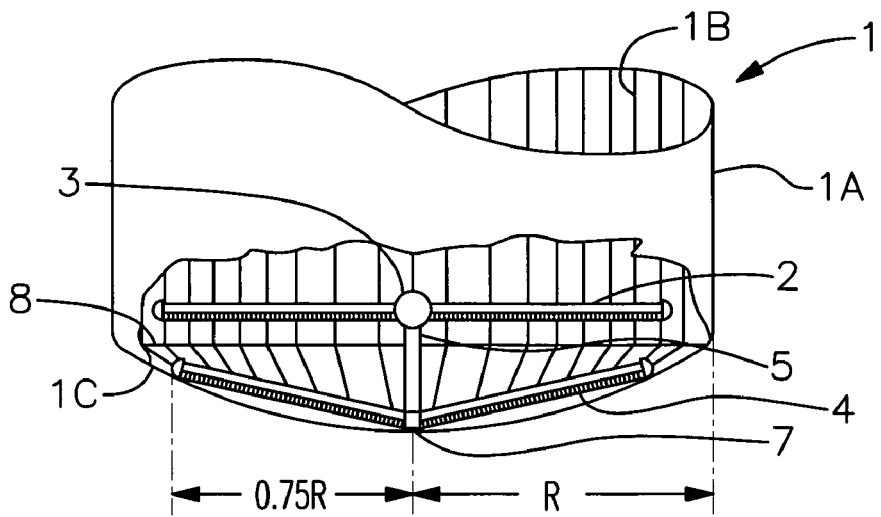
FIG. 1 is a side cross sectional view of a first tank used in a filtration system showing the typical rounded bottom of the tank where stagnation usually occurs and the location of the header in a first array which is immediately above the stagnation area. It also shows a second array below the first array in the stagnation area.

An object of the present invention is to provide a means for eliminating the stagnant area usually present in tank filtration system having rounded bases.

An object of the present invention is to remove the stagnant area in tank filtration systems without reducing the area of the primary filtrations array.

An object of the present invention is to provide a tank filtration system with a rounded bottom in which remedial laterals closely follow the contours of the rounded bottom of the tank.

An object of the present invention is to provide a primary filtration array and an efficient second remedial array that is easily fabricated and can be supplied at low cost.

The present invention is a filtration system contained in a tank having a rounded base that eliminates the stagnant area usually found in the area of the rounded base. In the normal operation of a filtration system, the water passed through the filter media where it deposits impurities and debris. The medium must be cleaned periodically and this is done during the backwash cycle where water is passed through in the reverse direction and dumped to eliminate the debris from the system.

Most filtration system include a first pipe array located above the rounded base which allows the back washing of the upper portion of the tank, but leaves the base area below the first pipe array stagnant and subject to the growth of harmful bacteria. The present invention adds a second or remedial array which is configured to follow the contours of the rounded base of the tank permitting it to cover more area. This second array is located in the base area and therefore is able to eliminate the stagnant area of the tank during the backwash cycle.

In the present invention, a downcorner (pipe section) from the header is split into 4 remedial horizontal lines. Each remedial "horizontal" makes an upward or positive angle of typically 22° with the horizontal axis to generally follow the curve of the base of the tank. These remedial horizontal lines are used to flush the base area of the tank and avoid bacterial growth in that area. The remedial horizontal lines form a second array which is in addition to the standard laterals of the first array that is located above the remedial laterals.

Cost is an important factor in providing a practical stagnation elimination system. The present invention provides such a practical system. It utilizes standard plumbing fixtures to place remedial laterals in the curved area at the base of the tank and these laterals generally extends out to 75% of the base. Only one downcorner connected to the first array is needed, eliminating the need for multiple downcorners used in prior art systems. The entire set of laterals in the first array remain in place, even though the remedial laterals are added, causing the filtration capability of the tank to be increased over standard systems having only a single array. The array can be varied from a single pipe or conduit to a plurality of pipes as the particular situation dictates. In most practical systems, a plurality of laterals are used to cover a wide area in the bottom of a tank. If an extensive secondary array is provided, a first array may be eliminated.

DETAILED DESCRIPTION OF THE INVENTION

FIG. 1 is a side view of a tank used in a filtration system showing the typical rounded base of the tank where stagnation usually occurs and also showing the location of the header of a first array which is typically positioned above the stagnation area. In this Figure, the tank is cut away on one side to show a first and a second array used in this filtration system. This Figure includes a tank 1 having an outside wall 1A and inside wall 1B, a first pipe array 2, a second pipe array 4, a header 3, a downcorner 5 connecting the first array to the second at a five way cross connector 7.

Figure 2:
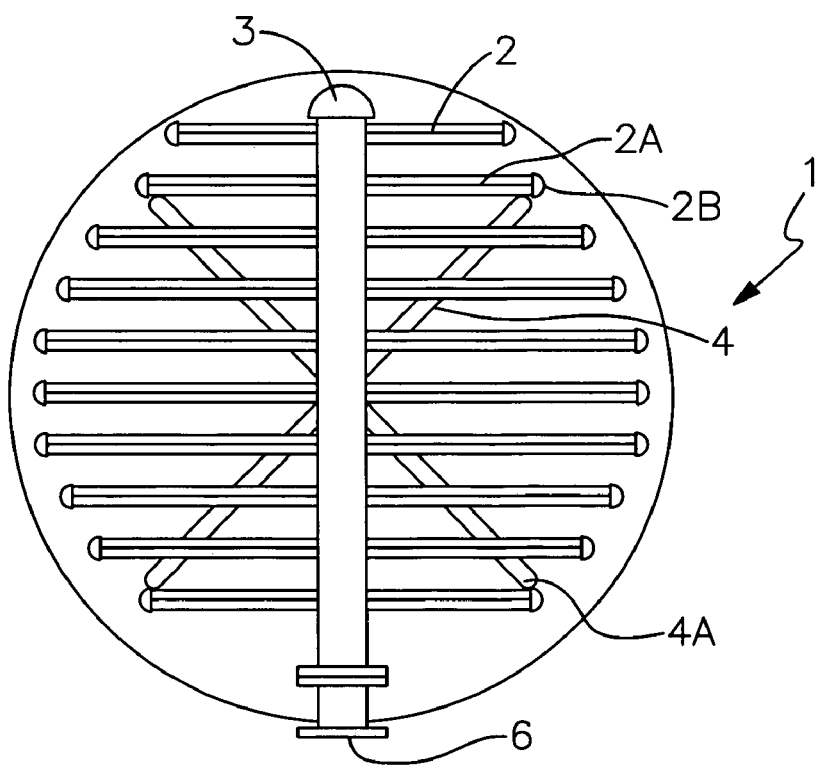
FIG. 2 is a top cross sectional view of the tank and filtration system shown in FIG. 1 showing a first pipe array located over a second array which is used to eliminate the stagnant area of the tank.

FIG. 2 is a top view of the tank and filtration system shown in FIG. 1 with the top of the tank removed to shown the first and second arrays. This Figure also shows that the header 3 is connected to the outside of the tank by means of a connector 6. The first array is formed of a series of horizontal laterals which are connected at one end to the header 3. Their opposite ends are capped. The second array lies below the first array and in one embodiment is in the form of cruciform formed by 4 remedial laterals such as remedial lateral 4A. As can be seen in FIG. 1, the four remedial laterals are connected to the five port cross connector 7 which is connected to the header by way of the downcorner 5. The five port cross has four side ports to accept the remedial laterals and a top port to accept the vertical downcorner. The side ports are adjusted to position the remedial laterals at an angle Y with respect to the horizontal. Angle Y is usually 22° which causes the remedial laterals to extend upwardly from the horizontal plane and outwardly outward from the five port cross.

As can be seen in FIG. 1, the bottom or base of the tank 1C is rounded and the angle Y of the remedial laterals allows these laterals to closely follow the bottom contours of the tank. The bottom of the tank can be seen to lie below a line 8 drawn horizontally across the tank at the level where the rounded base begins. The area below this line is where stagnation occurs. The first array lies well above this line, while the second array lies below this line.

As can be seen in FIG. 2, the first array 2 includes a series of lateral such as lateral 2A. Each lateral is capped at the end away from the header with a cap such as 2B. All laterals in both the first and second array include caps similar to that of 2B. As noted, each pipe includes thin slits on its sides and preferably on its bottom to allow water to pass, but not to let the filtration media, such as sand, enter the pipes. Prior art filtration systems typically included only a single array such as the first array. As a result, the filtration media above the first array was cleansed during back washing where water under pressure is forced through connector 6 into the header and out through slits in the horizontal laterals. This water passes through the medium to clean the medium and is discharged through an output port. This flow is in the opposite direction when the filler is used to clean the water. However, the area contained in the rounded bottom below line 8 was not cleansed during backwashing and resulted in a stagnant area in which bacteria was able to breed.

The first array found in most filtration systems cannot be lowered into the stagnant area portion of the tank below line 8 because it would run into interference with the rounded base 1C. With most prior art attempts to cleans the area below line 8, the system was either ineffective because of the use of too small an array or the system was costly because it included many downcorners and tees. With the present invention, standard plumbing fixtures allow the second array to closely follow the contours at the rounded base of the tank and with a single downcorner it is possible to cleans the filtration media located below line 8. Both the first and second arrays are considered as having an input port where water is accepted, such as the second array elbow 17 where it is connected to the header 11 and the downcorner 13 where it contacts the second array 12.

The physical area covered by the second array includes most of the base of the tank. As can be seen in FIG. 1, the second array extends out to more than three quarters the diameter of the tank. During backwash, the water from the second array is first forced downward by the slits on its bottom, reaching to the base of the tank itself. It is then forced upward and outward toward the side of the tank to clean the complete base of the tank. This water is then passed through an output port 22 where it is removed from the system.

Figure 3:
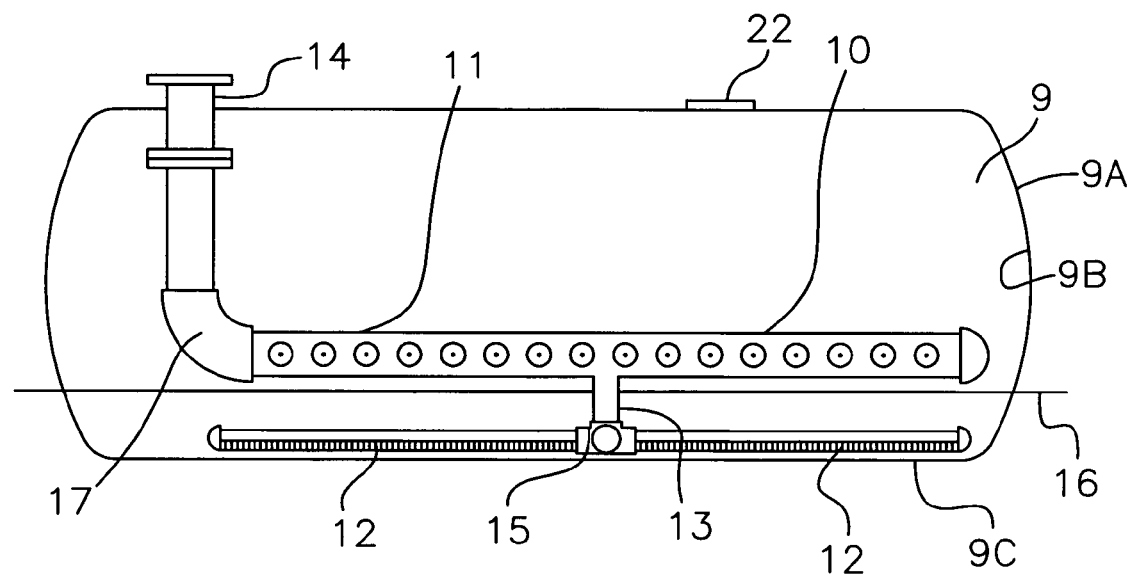
FIG. 3 is a side cross sectional view of a second tank. This is a horizontal cylindrical tank (HCT) showing the location of the horizontal laterals of a first array on top and the remedial laterals near the bottom of the tank.

As can be seen from the above discussion of the tank in FIG. 3, the present invention is not limited to vertically positioned tanks. The second tank 9, shown in this Figure, is positioned horizontally. Such tanks present similar stagnation problems to these found in vertical tanks because the bottom or base of the tank is also rounded or curved. FIG. 3 shows the second tank 9 to have an outside wall 9A, and inside wall 9B, a rounded base 9C, a series of horizontal laterals such as lateral 10, caps at the end of the laterals such as cap 10A, a header 11, remedial laterals such as lateral 12, a downcorner 13, a header connector 14, a five way cross 15, an elbow 17 and an output port 22.

Figure 4:
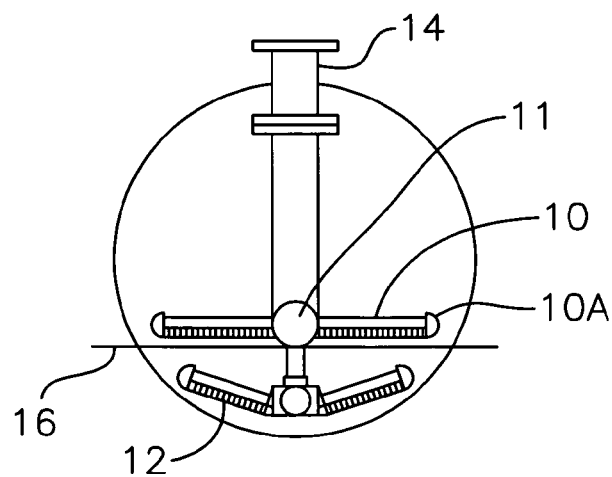
FIG. 4 is an end cross sectional view of the second tank of FIG. 3, showing the remedial lateral of the bottom or second array at a positive angle with respect to the horizontal plane.

FIG. 4 is an end view of the tank shown in FIG. 3. This Figure shows the upward angle that the remedial headers make with the horizontal plane to conform to the curvature of the base of the tank. The connector 14 which can be seen in this Figure is used to connect the header with the outside of the tank. The connector 14 is located on the top of the tank in this case. Elbow 17 permits the connection from one end of the horizontal header 11 to the vertically positioned connector 14.

The remedial laterals are placed at an angle with respect to the horizontal plane to enable them to better follow the contours of the rounded bottom or base of this tank, as was done with the tank shown in FIGS. 1 and 2.

The remedial headers can be connected to a five way cross or a multiport connector with less than or greater than 5 ports. Alternatively, since the second tank is positioned horizontally, a second header can be run directly below the first header and the remedial laterals can be extended radially from the second header in a maimer similar to the laterals connected to the first header.

As noted earlier, it is possible with a large second or remedial array to entirely eliminate the first array. The large second array will filter and backwash the entire tank including the bottom of the tank.

Figure 5:
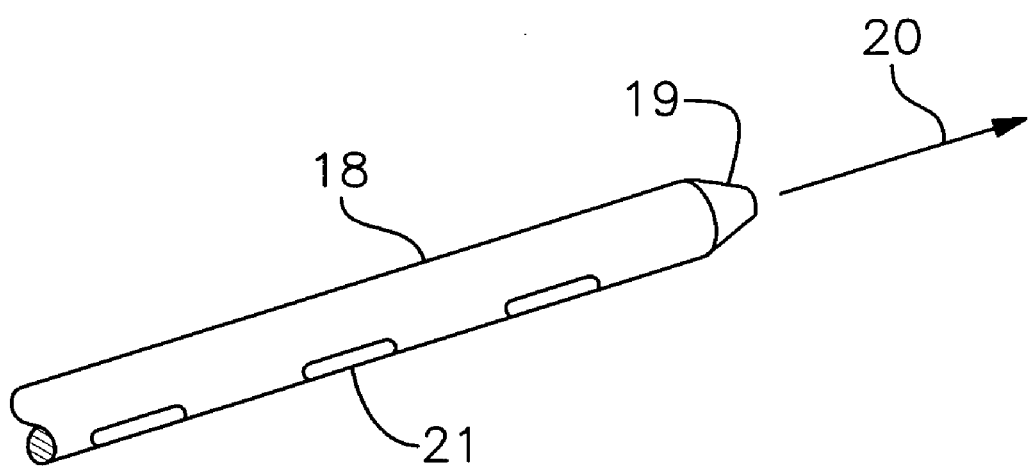
FIG. 5 is a side view of a remedial or second array lateral having slots on its bottom side and a nozzle at its end away from the header.

FIG. 5 shows a side view of a remedial or second array lateral 18 with slots 21 on its bottom and a nozzle 19 at its end, away from the header. Normally, the pipe ends are capped, however, in this embodiment, the cap is replaced by a nozzle. The slots on the bottom side direct fluid downward and into the medium to help clean the medium below the lateral. In place of an end cap, this lateral incorporates a nozzle 19 to direct fluid in the direction of the arrow 20 which is in the Longitudinal direction of the lateral to aid in cleaning the medium which cannot be covered by the lateral itself. The nozzle direction can be set to an angle with respect to the longitudinal axis of the lateral to provide maximum coverage in a particular installation.

The embodiments shown in the Figures and described above are only illustrative. After the disclosure of the invention to those skilled in the art, many equivalent systems will become apparent. All such equivalents are considered within the spirit and scope of this invention. Such equivalents include, but are not limited to, using a 22° or other angles as necessary to conform to the rank shape, elbows located in the middle of the remedial laterals of the second array to permit following the base contours more accurately and extend the array to cover an arc of as much as 100° or more of the bottom of the tank. The downer supplying the second array maybe connected to the first array or directly to the tank input port. It is also possible to increase the area of the second array by using different standard or even custom angles other than 22° and using splitters with more or less than four horizontal ports. As noted, a second array with sufficient lateral coverage of the tank can serve as the only array, making it possible to eliminate the conventional first array with considerable cost savings. Where the same size tank is often used, it becomes financially feasible to use pre-bent or curved laterals which can be better fitted to the curvature of the tank to provide even better coverage of the bottom of tanks.

The invention claimed is:

1. A filter system for cleaning a fluid by passing it through a filter medium, said system being capable of cleaning said medium by backwashing and said system being capable, during the backwashing cycle, of preventing bacterial buildup, said system comprising:

a) a tank having a closed shell with a curved bottom b) a filter medium resting inside and on the bottom of said tank, said medium filling at least a portion of said tank c) a tank input port passing through the shell of said tank to provide an inlet for the tank which accepts fluid used to backwash the medium in said system d) a tank output port passing through the shell of said tank to provide an outlet for the fluid in said tank after it has backwashed the medium in the tank by passing fluid through said medium e) a first array formed of at least one conduit for carrying fluid, said array having a first array input port which is connected to the tank input port inside the tank to accept the fluid from the tank input port, said first array having a plurality of first array output ports distributed along the length of its conduit to permit fluid supplied to said first array from said tank input port to be discharge from said first array into said medium, said first array being positioned generally above said curved tank bottom, and inside said medium to cause the fluid passing through said first array to further pass through said medium to clean said medium by way of backwashing said medium about and above said first array, said fluid being collected from said medium after backwashing for discharge from said tank and from said system through said tank output port, and f) a second array formed of at least one conduit for carrying fluid positioned in said medium below said first array and in the curved bottom area of said tank within said medium in said tank, said second array having a second array input port at one end of said second array conduit and a plurality of a second array output ports distributed along said second array conduit, said second array input port being connected to said first array to receive fluid from said first array and pass this fluid on through said second array output ports into said medium in the lower curved portion of the tank to dislodge and remove bacteria and debris in the medium thereby preventing bacterial buildup in this area, said second array consists of straight conduits positioned generally horizontally in said tank and each conduit extending a length which avoids contact with said curved portion of said tank, and wherein the second array conduits contain end caps and said end caps contain at least one second array output port to extend the cleaning range in the direction beyond said end caps.

2. A filter system as claimed in claim 1 wherein a second army end cap contains an output port in the form of a nozzle to direct the discharge into the medium a greater distance than an array output port.

* * * * *